(12) United States Patent
Gigliotti et al.

(10) Patent No.: US 8,887,181 B1
(45) Date of Patent: Nov. 11, 2014

(54) APPLICATION ADD-ON PLATFORM

(71) Applicant: Amazon Technologies, Inc., Reno, NV (US)

(72) Inventors: Samuel S. Gigliotti, Seattle, WA (US); Luhui Hu, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 93 days.

(21) Appl. No.: 13/626,712

(22) Filed: Sep. 25, 2012

(51) Int. Cl.
*G06F 13/00* (2006.01)

(52) U.S. Cl.
USPC .................................. 719/328; 713/1; 713/2

(58) Field of Classification Search
CPC ...................................................... G06F 9/541
USPC ......................................... 719/328; 713/1, 2
See application file for complete search history.

(56) References Cited

U.S. PATENT DOCUMENTS

| | | | | |
|---|---|---|---|---|
| 7,509,638 | B2 * | 3/2009 | Backhouse et al. | 717/177 |
| 7,519,976 | B2 * | 4/2009 | Blevins | 719/328 |
| 8,407,461 | B2 * | 3/2013 | Cheong et al. | 713/100 |
| 2004/0221261 | A1 * | 11/2004 | Blevins | 717/107 |
| 2007/0005734 | A1 * | 1/2007 | Abdo | 709/219 |
| 2007/0220502 | A1 * | 9/2007 | Asselin et al. | 717/163 |
| 2011/0126118 | A1 * | 5/2011 | Bergeron et al. | 715/744 |
| 2012/0137304 | A1 * | 5/2012 | Boullery et al. | 719/313 |

\* cited by examiner

*Primary Examiner* — Andy Ho
(74) *Attorney, Agent, or Firm* — Lowenstein Sandler LLP

(57) ABSTRACT

An application add-on platform of a user device receives a query for add-ons from an application running on the user device. The application add-on platform notifies the application of one or more add-ons that are compatible with the application. The application add-on platform receives an access request from the application for an add-on of the one or more add-ons. The application add-on platform connects the application to the add-on.

23 Claims, 11 Drawing Sheets

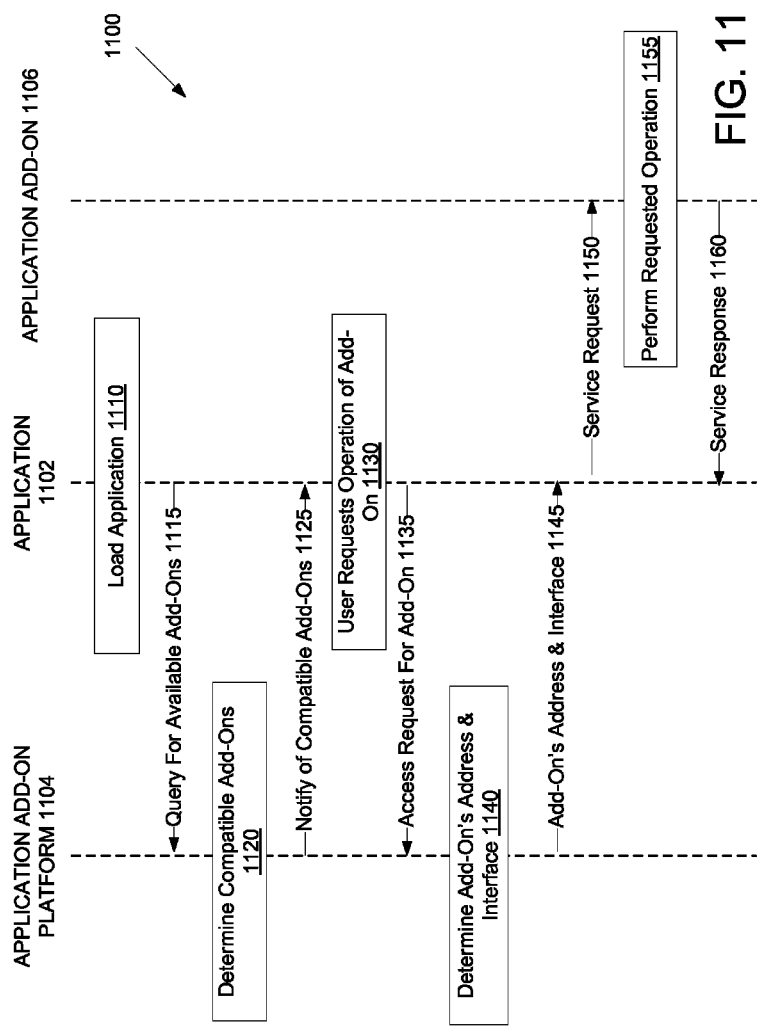

APPLICATION ADD-ON PLATFORM

BACKGROUND

Many modern devices have architectures that isolate processes from one another. This increases security, but may reduce an ability of applications to share resources and libraries. Accordingly, developers may implement the same or similar features repeatedly across different applications. This can increase resource utilization on the device, such as an amount of resources that are used to upgrade applications on the devices, an amount of memory that is used to store applications, and so on.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 7 is a flow diagram of one embodiment for a method of enabling an application to use an application add-on.

FIG. 9 is a flow diagram of one embodiment for a method of enabling an application to use an application add-on.

FIG. 10 is a flow diagram of one embodiment for a method of enabling multiple applications to use an application add-on.

FIG. 11 is a sequence diagram illustrating one embodiment of an application using an application add-on.

DETAILED DESCRIPTION

Figure 1:
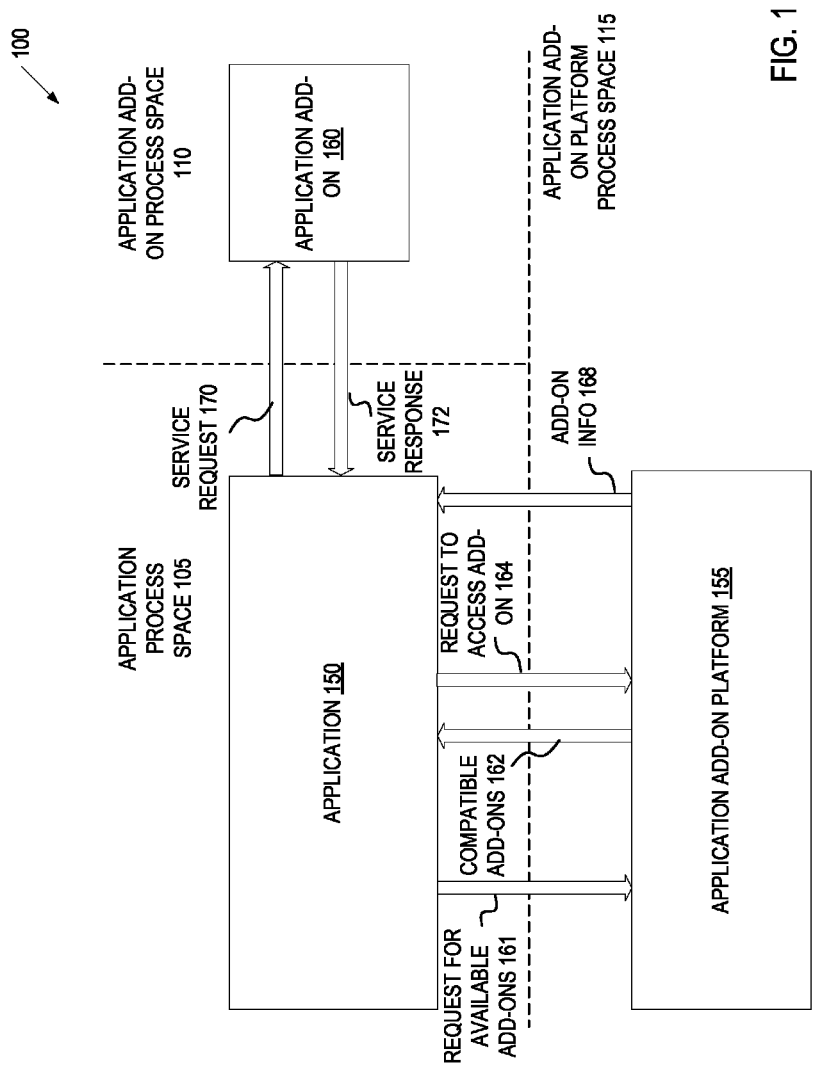
FIG. 1 illustrates an application add-on platform that enables an application to use an application add-on, in accordance with one embodiment of the present invention.

An application add-on platform is described herein, as well as methods for using the application add-on platform to enable applications to utilize application add-ons. An application add-on platform may be an application that manages application add-ons and that connects applications to the managed application add-ons. An application add-on may be a set of software components that adds specific functionality to another (typically larger) software application. Examples of application add-ons include plug-ins, extensions, snap-ins and themes. Add-ons may be structured as independent applications that provide functionality to other applications.

Application add-ons may register with the application add-on platform when they are installed on a user device. When an application loads (or sometime thereafter), the application may query the application add-on plaform for available application add-ons. The application add-on platform may then determine which of the registered application add-ons are compatible with the application, and may notify the application of the compatible add-ons.

During execution of an application, the application may send a request for an application add-on to the application add-on platform. In response, the application add-on platform may determine an address (e.g., a memory address) of the application add-on as well as data describing an interface (e.g., an application programming interface (API)) for the application add-on. The application add-on platform may send this information to the application, which may then use the address and the data describing the interface to communicate directly with the application add-on. Thus, the application add-on platform may connect applications to application add-ons.

In an example, a Chinese language interface application add-on may be registered with the application add-on platform. Some or all applications installed on the user device may lack native support for the Chinese language. Any of these applications may query the application add-on platform for use of the Chinese language interface add-on. The application add-on platform may then launch the Chinese language interface add-on, and connect some or all of the applications to the Chinese language interface add-on.

The application add-on platform may also manage updates (also referred to as upgrades) to registered add-ons. This may be an automatic update mechanism. For example, the application add-on platform may query a host to inquire about updates to any of the add-ons that are registered to the application add-on platform. If there are updates for any of the add-ons, then the application add-on platform may automatically download the updates and then apply them to the registered add-ons.

Note that the application add-on platform may be a distinct application. Add-ons may be registered to the application add-on platform rather than to any particular application that will utilize those application add-ons. Thus, the application add-on platform may provide increased flexibility for cross-utilization of add-ons by applications. The application add-on platform may additionally connect multiple applications to a single application add-on, enabling those applications to share usage of the application add-on. This may conserve system resources while increasing the functionality of applications. Moreover, the add-on platform enables new features and functionality to be added to applications after those applications have been compiled, built and/or distributed to user devices. Such addition of functionality may be performed simply by installing a new add-on, and without updating the applications that will use the add-on. This may free developers from implementing the same or similar features repeatedly for multiple different applications. Additionally, this may enable developers to incrementally enhance or add functions to applications without updating the applications. Moreover, the application add-on platform may enable third parties to develop functionality for applications.

FIG. 1 illustrates an application environment 100 that includes an application add-on platform for enabling an application to use application add-ons, in accordance with one embodiment of the present invention. An operating system of a user device may create a separate isolated process space for each application that runs on the operating system. The Android® operating system is one example of an operating system for devices that isolates applications in separate process spaces. Application environments that segregate applications into isolated process spaces in this manner may increase the security of users, data, applications, the device, and the network. In one embodiment, the application environment 100 includes three separate and isolated process spaces, including an application process space 105, an application add-on process space 110 and an application add-on platform process space 115.

An application add-on platform 155 runs in the application add-on platform process space 115. The application add-on platform process space 115 may be created when an operating system that provides the application environment 100 is loaded. The application add-on platform 155 may then be loaded into the application add-on platform process space 115. The application add-on platform 155 may run in a background of the operating system until it is called by an application.

Application add-on platform 155 may be responsible for connecting application add-ons to applications. Application add-on platform may additionally connect applications to other applications. Thus, application add-on platform 155 may enable users and developers to plug an add-on into an application, or even to plug one application into other applications as a component or feature. Accordingly, the application add-on platform provides an open application interface for feature extensions that can be exploited by external developers to continuously improve existing applications. This can alleviate an application development schedule and reduce a development cycle for those applications.

Application process space 105 may be created for an application 150 when the application is instantiated. As part of a loading process, the application 150 may send a request 161 to the add-on platform 155 for available add-ons. Alternatively, or additionally, the application 150 may query the application add-on platform 155 any time after it has loaded (e.g., in response to a user command).

The application add-on platform 155 may determine what registered add-ons are compatible with the application 150, and may send a notification 162 to the application 150 reporting on the compatible add-ons. At any time during the application's operation, the application 150 may request 164 access to one of the compatible add-ons from the application add-on platform 155. The request may identify a particular operation of the add-on that is requested, or may simply request access to the add-on. In response to the access request, the application add-on platform 155 determines an address of the application add-on 160.

If the application add-on 160 is not running, then the application add-on platform 155 causes the application add-on to be loaded. The application add-on process space 110 may be created, and the application add-on 160 may be loaded into this application add-on process space 110. The application add-on may be a standalone application that can run independently on the user device. However, some application add-ons may lack features such as a user interface that are commonly found in larger applications.

The application add-on 160 may report its address (e.g., its memory address, the memory address of the application add-on process space, and so on) to the application add-on platform 155. The application add-on platform 155 may cache the add-on's address, and may notify the application 168 of the add-on's address. Additionally, the application add-on platform 155 may maintain metadata associated with the application add-on 160. This metadata may identify an interface (e.g., an API) of the application add-on 160. For example, the metadata may identify a syntax for messages that are to be sent to the application add-on, information that should be included in messages to the application add-on, calls to particular operations that can be performed by the application add-on, and so forth. This metadata (or a subset of this metadata) may be reported to the application 150 along with the address of the application add-on.

Once the application has the address and information describing the interface of the application add-on, the application 150 may communicate directly with the application add-on 160, such as by sending a service request 170 to the application add-on 160. In one embodiment, the application 150 communicates directly with the application add-on 160 using standard inter-process communication (IPC) protocols. For example, the application 150 may send remote procedure calls (RPCs) to the application add-on, communicate with the application add-on using shared memory, communicate with the application add-on using shared files, communicate using pipes, and so on. The specific communication techniques that are available may depend on an operating system on which the application add-on 160 and application 150 are running. For example, the Android operating system provides a message passing system that enables applications to communicate across application boundaries. The message passing system provides applications with an ability to generate and exchange intent objects that may identify to another application actions and/or data on which to operate. The message passing system further provides remote methods that make application procedure interfaces (APIs) accessible by other processes. An application 150 and application add-on 160 running on the Android operating system may use the provided message passing system to communicate. Thus, the application 160 may use a remote method of the Android operating system, for example, to call an API of the application add-on 160.

The service request 170 may be addressed to the address of the application add-on, and may be formatted in accordance with the received data describing the interface of the application add-on 160. The service request may be a command to perform a particular operation or set of operations, and may include data to be operated on. The application add-on 160 may perform the requested operation, and may send back a service response 172 to the application 150, which may include a result of the requested operation. Thus, the application 150 may use the application add-on platform 155 to initially establish a connection to the application add-on, but may not use the application add-on platform 155 for further communications or data exchanges with the application add-on 160.

Note that a conventional application may also be used instead of an application add-on. The conventional application may register with the application add-on platform 155 in the same manner as an application add-on. The registration may identify features and operations of the application that it makes available for use by other applications. Thus, any applications may make functions available for use by other applications using the application add-on platform, and any application may utilize functions provided by other applications.

Figure 2:
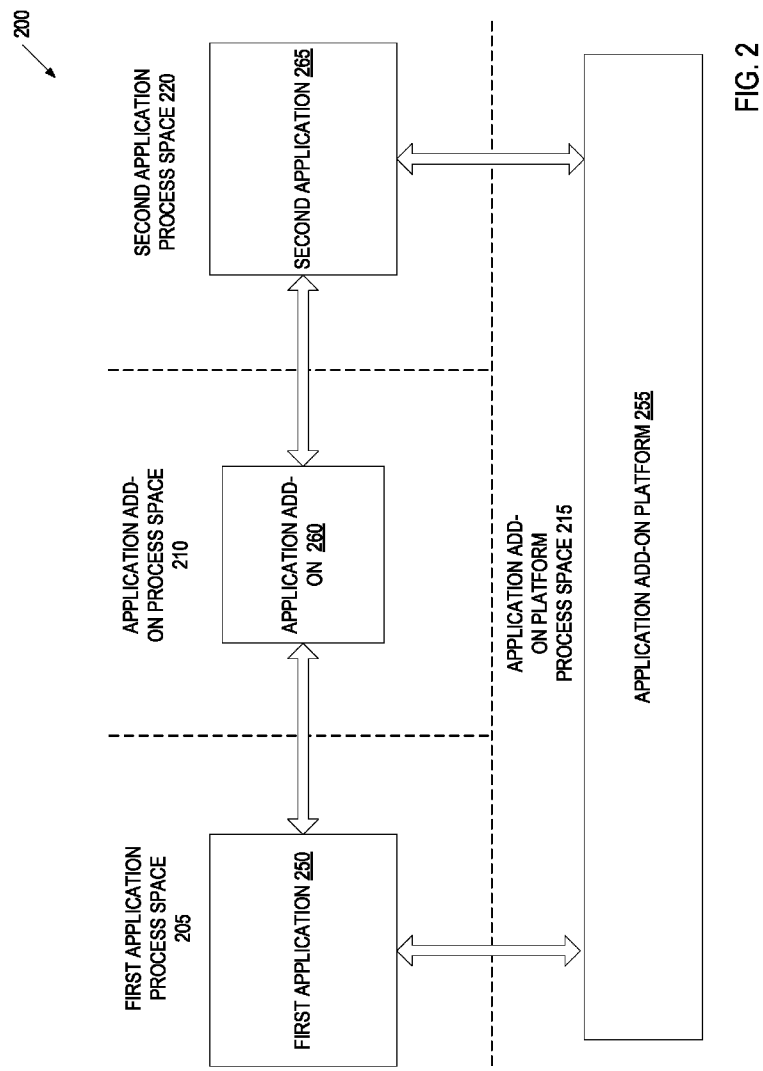
FIG. 2 illustrates an application add-on platform that enables multiple applications to use the same application add-on, in accordance with one embodiment of the present invention

FIG. 2 illustrates an application environment 200 that includes an application add-on platform for enabling an application to use application add-ons, in accordance with one embodiment of the present invention. The application environment 200 includes four separate and isolated process spaces, including a first application process space 205, a second application process space 220, an application add-on process space 210 and an application add-on platform process space 215.

An application add-on platform 255 runs in the application add-on platform process space 215. A first application 250 runs in the first application process space 205. Similarly, a second application 265 runs in the second application process space 220. Both the first application 250 and the second application 265 may query the application add-on platform 255 for available add-ons. Additionally, both the first application 250 and second application 265 may request access to the same application add-on 260, which may run in application add-on process space 210.

Application add-on platform 255 may determine and select a version of the application add-on 260 that is compatible with both the first application 250 and the second application 265. If a version of the application add-on 260 that is compatible with both applications is identified, application add-on platform 255 may cause that version of the application add-on 260 to be loaded into the application add-on process space 210. The application add-on platform 255 may then send data to both applications that enable those applications to communicate directly with the application add-on. For example, the application add-on platform may send an address of the application add-on 260 and information on an interface of the application add-on 260 to both the first application 250 and the second application 265.

Both the first application 250 and the second application 265 may then utilize the same instance of the application add-on 260 in parallel. Each application may send service requests to the application add-on 260, and may receive service responses from the application add-on. Service requests may be placed into a queue of the application add-on 260, and the application add-on may process service requests in accordance with a position in the queue (e.g., using a first in, first out (FIFO) model with or without considering request priority). Alternatively, other models may be used for managing concurrent use of the application add-on by multiple applications.

In one embodiment, rather than communicating with the application add-on 260 directly, the applications send service requests to application add-on platform 255. Application add-on platform 255 may maintain a message queue for handling events and/or messages between applications and add-ons. Application add-on platform 255 may forward service requests of the applications to the application add-on 260 when these service requests reach a front of the message queue. Application add-on 260 may send service responses directly to the application that issued the service request, or to the application add-on platform for forwarding to the appropriate application. Providing a message queue by the application add-on platform 155 may free the application add-on from providing such a message queue.

Figure 3:
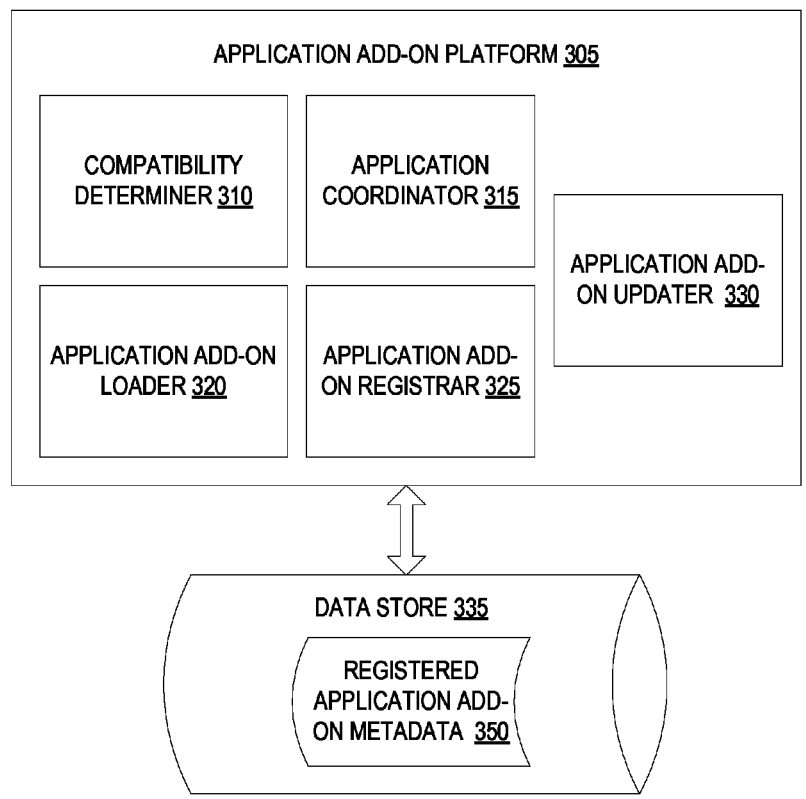
FIG. 3 is a block diagram of one embodiment of an application add-on platform.

FIG. 3 is a block diagram of one embodiment of an application add-on platform. In one embodiment, the application add-on platform 305 includes a compatibility determiner 310, an application coordinator 315, an application add-on loader 320, an application add-on registrar 325 and an application add-on updater 330. The application add-on platform 305 may additionally be connected to a data store 335, which may contain registered application add-on metadata 350. The data store 335 may be a local data store of a user device, such as a hard disk drive, solid state drive, random access memory (RAM), Flash memory, and so on. The data store 335 may additionally or alternatively be network storage, such as a storage area network (SAN), network attached storage (NAS), or other type of network storage.

Add-ons may be configured to report metadata to the application add-on registrar 325 when they are installed. Alternatively, application add-on registrar 325 may query new add-ons during or after installation of those add-ons. Application add-on registrar 325 may receive metadata from an application add-on that identifies an interface of the application add-on. The identification of the interface may include commands that the add-on understands, data to include along with commands, syntax for requesting particular operations, and so on. In one embodiment, the information on the add-on's interface is data describing an application programming interface (API) of the add-on.

The received metadata may additionally include version compatibility information. The version compatibility information may identify applications that are compatible with the version of the add-on that is being installed, as well as versions of those applications that are compatible with the version of the add-on that is being installed. Note that an installation of a current version of an add-on may include previous versions of the add-on. Alternatively, distinct versions of an application add-on may be separately installed on the user device. Therefore, if appropriate, an older version of the add-on may be launched (e.g., to ensure compatibility with a particular application or applications).

The version compatibility information may also identify applications that are permitted to use the application add-on. For example, only applications that implement particular security features may be allowed to use a particular add-on. This may ensure that security measures of the user device are complied with.

Note that applications other than application add-ons may also register with the application add-on platform. Such applications may identify add-ons that they are compatible with (as well as versions of those add-ons that they are compatible with) during the registration. If an application will provide external functionality to other applications, then the application may register interface data for utilizing the application's interface (e.g., that applications API).

In one embodiment, compatibility determiner 310 compares version compatibilities of installed applications to installed versions of add-ons. If any add-on versions are identified that are not supported by installed applications, then compatibility determiner 310 may remove (e.g., uninstall) those add-on versions from the user device. Additionally, if all installed applications support a newer version of an add-on, then an older version of the add-on may be removed from the user device.

Application add-on platform 305 may receive queries from applications asking what registered add-ons are available for use by those applications. In response to application add-on platform 305 receiving such a query, compatibility determiner 310 may examine the registered application add-on metadata 350 to determine which (if any) add-ons are compatible with the application. The query may identify a version of the application that is in service. Compatibility determiner 310 may compare the version of the application to the different available versions of registered add-ons using the metadata. Alternatively, the application coordinator 315 may use a data structure such as a table that maps versions of add-ons to compatible versions of applications. The application add-on registrar 325 may generate this data structure, and may update the data structure as new applications and/or add-ons are installed on the user device.

Compatibility determiner 310 may then send a report to the application identifying all of the add-ons that are compatible with the version of the application. If a version of an application is compatible with multiple versions of an add-on, then a highest add-on version that the application is compatible with may be reported to the application. Alternatively, multiple compatible versions of add-ons may be reported to the application.

The application may request access to a particular add-on that it is compatible with. For example, a user may request that the application perform a function that is actually provided by an add-on rather than by the application itself. In response to such a user request, the application may generate an add-on access request, and send the access request to the application add-on platform 305. In response to application add-on platform 305 receiving such an add-on access request, application add-on loader 320 determines whether there are any compatible instances of the add-on running. If the add-on is not running (or if only instances of the add-on that are incompatible with the application are running), then application add-on loader 320 will cause a new instance of the add-on to be loaded. The new instance of the add-on may be loaded in a new process space, and may be a highest version of the application add-on that is compatible with the application. Alternatively, the application add-on may be loaded in the application add-on platform's process space. Once an add-on is loaded, application add-on loader 320 may cache an address of the add-on.

Note that application add-on loader 320 may also load application add-ons based on an anticipated use of those application add-ons by applications. For example, application add-on loader 320 may load one or more add-ons that are compatible with an application when that application is loaded and/or when that application queries the application add-on platform for available add-ons.

Application coordinator 315 connects applications to loaded application add-ons. This may include sending metadata to applications that identifies an address of an add-on as well as sending data identifying an interface (e.g., API) of the add-on. Once the application receives this data, it may perform all subsequent communications associated with the add-on directly with the add-on (e.g., without routing the communications through the application add-on platform). Alternatively, some or all subsequent communications may be routed through the application add-on platform (e.g., if a message queue provided by the application add-on platform is used). Communications between applications and application add-ons may be performed, for example, using an inter-process communication (IPC) protocol.

Application add-on updater 330 may periodically (e.g., every 5 minutes, once a day, once a week, or at some other interval) query a server to determine if any add-ons that are registered to the application add-on platform 305 have available updates. Application add-ons may identify an address of an update server to query for updates. Alternatively, or additionally, application add-on updater 330 may be configured with addresses of one or more servers that host multiple different add-ons (e.g., an add-on repository). Accordingly, application add-on updater 330 may query a single server or multiple servers for updates. If an update to a registered application add-on is identified, then the application add-on updater 330 may download the application add-on update and/or a new version of the application add-on. Application add-on updater 330 may then apply the update to the already installed application add-on or reinstall the new version of the application add-on. As part of the updating and/or reinstallation process, application add-on updater 330 may modify registered application add-on metadata 350 associated with the updated application add-on. Application add-ons may be upgraded incrementally in this manner as new updates become available. These incremental upgrades may introduce new features that were not previously available to applications that utilize the application add-ons. Thus new features can be added to applications without actually making any modifications to those applications.

Figure 4:
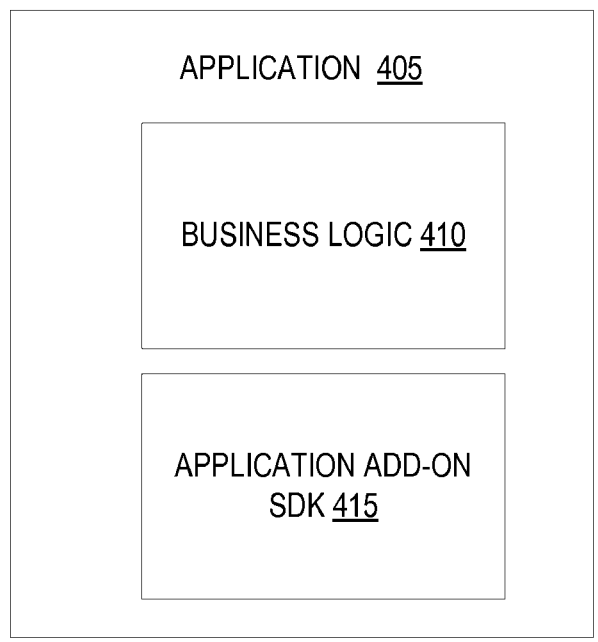
FIG. 4 is a block diagram of one embodiment of an application that can communicate with an application add-on platform.

FIG. 4 is a block diagram of one embodiment of an application that can communicate with an application add-on platform. The application may include business logic 410 and an application add-on service development kit (SDK). The business logic 410 may include all components of the application other than the application add-on SDK 415. For example, the business logic 410 may include an API, functions, operations, a graphical user interface (GUI), and any other information used for the operation of the application. The application add-on SDK 415 includes instructions for communicating with the application add-on platform. The application add-on SDK 415 may include instructions for querying the application add-on platform for available add-ons and for requesting access to application add-ons. The application add-on SDK 415 may include instructions for registering the application with the application add-on platform (e.g., when the application is installed or first executed after installation).

The application add-on SDK 415 may additionally provide an ability to extend an application GUI (e.g., provide a menu item on the application). For example, the application add-on SDK 415 may provide a menu or button that is integrated into the application's GUI. The menu or button may indicate one or more application add-ons that can be invoked and/or specific operations provided by application add-ons. By selecting a menu option or pressing a button associated with an application add-on, a user may cause the application to be connected to that application add-on so that the application add-on can perform one or more operations for the application. Thus, any controls or features that are offered by an add-on may appear as an integrated or built-in feature of the application. This may provide easy access to invoke the application add-on, and may provide an intuitive interface for the user to utilize functions provided by the add-ons.

In one embodiment, the application add-on platform is loaded at startup of a mobile operating system for a mobile device and runs in a background on the mobile operating system. Alternatively, the application add-on platform may not be loaded until it is requested. In such an embodiment, the application add-on SDK 415 may additionally include instructions for loading the application add-on platform.

Figure 5:
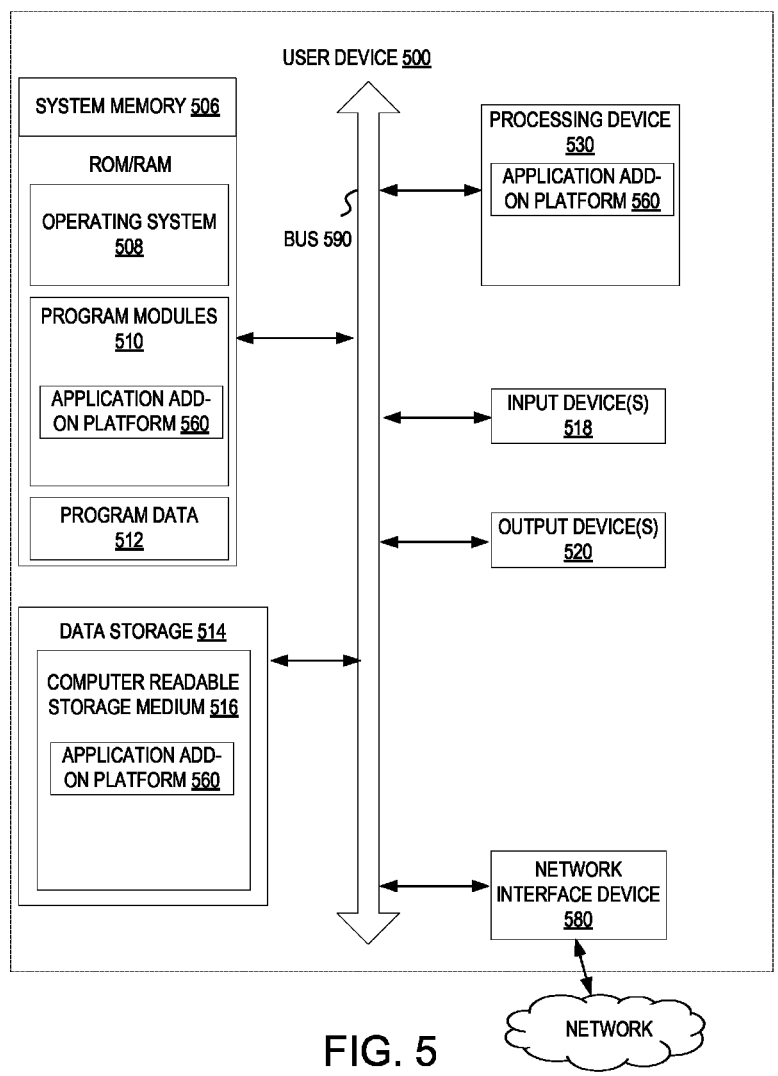
FIG. 5 is a block diagram illustrating an exemplary user device, in accordance with one embodiment of the present invention.

FIG. 5 is a block diagram illustrating an exemplary user device 500, in accordance with one embodiment of the present invention. The user device 500 may be a device such as an electronic book reader, a PDA, a camera, a video camera, a netbook, a mobile phone, a laptop computer, a portable media player, a tablet computer, an electronic pad, and so on. The user device may also be a traditionally non-portable device such as a desktop computer, a server, a set-top box, a gaming console, or the like.

The user device 500 includes a processing device 530, which may include one or more processors such as CPUs, microcontrollers, field programmable gate arrays, or other types of processors. The user device 500 also includes system memory 506, which may correspond to any combination of volatile and/or non-volatile storage mechanisms. The system memory 506 stores information which provides an operating system component 508, various program modules 510 such as application add-on platform 560, and/or other components (e.g., applications). The user device 500 performs functions by using the processing device 530 to execute instructions provided by the system memory 506.

The user device 500 also includes a data storage device 514 that may be composed of one or more types of removable storage and/or one or more types of non-removable storage. The data storage device 514 includes a computer-readable storage medium 516 on which is stored one or more sets of instructions embodying any one or more of the methodologies or functions described herein. As shown, instructions for the reader module 560 may reside, completely or at least partially, within the computer readable storage medium 516, system memory 506 and/or within the processing device 530 during execution thereof by the user device 500, the system memory 506 and the processing device 530 also constituting computer-readable media. The user device 500 may also include one or more input devices 518 (keyboard, mouse device, specialized selection keys, etc.) and one or more output devices 520 (displays, printers, audio output mechanisms, etc.).

The user device 500 may also include a network interface device 580 such as a wireless modem to allow the user device 500 to communicate via a wireless network (e.g., such as provided by the wireless communication system) with other computing devices, such as a server system and/or other user devices. The network interface device 580 may be a wireless modem that allows the user device 500 to handle both voice and non-voice communications (such as communications for text messages, multimedia messages, media downloads, web browsing, etc.) with the wireless communication system 580. The wireless modem may provide network connectivity using any type of mobile network technology. The wireless modem may generate signals and send these signals to a power amplifier (amp) for amplification, after which they are wirelessly transmitted via an antenna. In addition to sending data, the antenna also receives data (e.g., electronic publications and/or state data), which may be sent to a wireless modem and/or transferred to the processing device 530.

Figure 6:
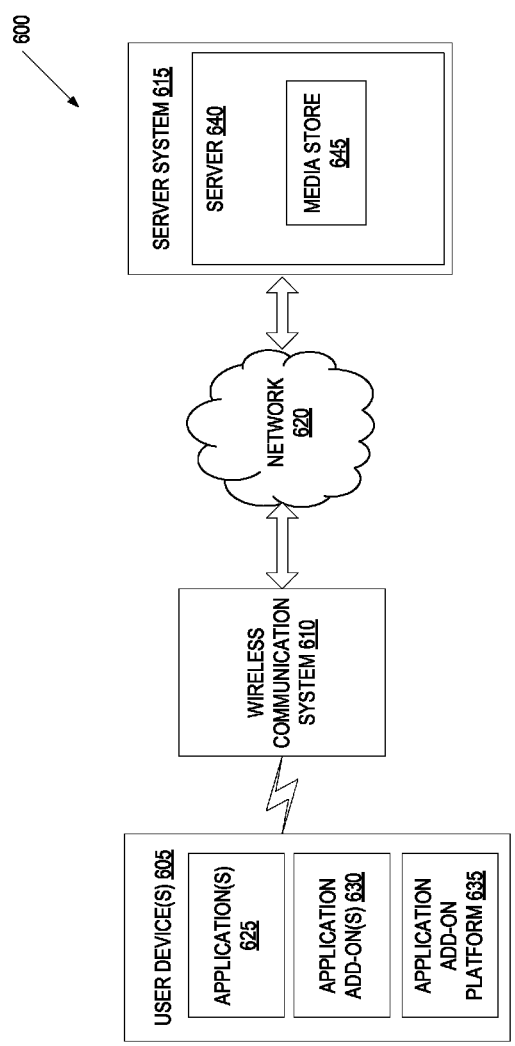
FIG. 6 is a block diagram of an exemplary network architecture, in which embodiments of the present invention may operate.

FIG. 6 is a block diagram of an exemplary network architecture 600, in which embodiments described herein may operate. The network architecture 600 may include a server system 615 and one or more user devices 605 capable of communicating with the server system 615 via a network 620 (e.g., a public network such as the Internet, a private network such as a local area network (LAN), or a combination thereof).

The user devices 605 may be portable computing devices and/or non-portable computing devices. In one embodiment, the user devices 605 correspond to user device 500 of FIG. 5. Some examples of user devices 605 are mobile phones running the Android, iOS®, or Windows® Mobile operating systems.

User devices 605 may be connected to the network 620 via a wireless communication system 610. The wireless communication system 610 may be a wireless infrastructure that allows users to use the user devices to communicate with server system 615 without being tethered to the server system 615 via hardwired links. Wireless communications system 610 may be a wireless fidelity (WiFi) hotspot connected with the network 620. Wireless communication system 610 may alternatively be a wireless carrier system (e.g., as provided by Verizon®, AT&T®, T-Mobile®, etc.) that can be implemented using various data processing equipment, communication towers, etc. Alternatively, or in addition, the wireless communication system 610 may rely on satellite technology to exchange information with the user devices 605. Other user devices may be connected to the network 620 via a wired connection (e.g., via an Ethernet connection).

In one embodiment, the network architecture 600 includes a communication-enabling system (not shown) that serves as an intermediary in passing information between the server system 615 and the wireless communication system 610. The communication-enabling system may communicate with the wireless communication system 610 (e.g., a wireless carrier) via a dedicated channel, and may communicate with the server system 615 via a non-dedicated communication mechanism, e.g., a public Wide Area Network (WAN) such as the Internet.

In one embodiment, the user devices 605 include one or more applications 625, one or more application add-ons 630 and an application add-on platform 635. The applications 625, application add-ons 630 and application add-on platform may run in separate and distinct process spaces, which may be isolated from one another. The application add-ons 630 may provide services to applications 625. For example, application add-ons 630 may provide functionality to applications 625 that the applications do not natively support. The application add-on platform 635 may connect applications 625 to application add-ons 630.

The server system 615 may include one or more machines (e.g., one or more server computers, routers, gateways, etc.) that have processing and storage capabilities to provide server-based functionality. The server system 615 may be implemented by a single machine or a cluster of machines, each of which may include data stores and/or other data processing equipment. In one embodiment, the server system 615 includes one or more network based servers, which may be hosted, for example, by network based hosting services such as Amazon's® Elastic Compute Cloud® (EC2).

The server system 615 includes a server 640, which may provide network-accessible server-based functionality. In one embodiment, the server 640 provides media items such as electronic books, electronic magazines, videos, images, applications, add-ons, and so on to user device 605. The user devices 605 may access the media store 645, for example, by navigating to particular web pages and selecting electronic publications for purchasing, renting, viewing, etc. The user devices 605 may additionally access the media store 645 by executing and navigating a dedicated application for browsing and acquiring media items such as applications and/or add-ons. The server system 615 delivers, and the user devices 605 receive, media items that may include web pages, ebooks, applications, add-ons and so on via the network 620.

Note that embodiments of the present invention may apply to additional architectures other than the illustrated network architecture. For example, embodiments of the present invention may be used in a client server environment in which the server system is a component of a wireless carrier. Alternatively, the user devices may be set-top boxes, and the server system may be a cable head-end. Embodiments may also apply to peer-to-peer environments, in which one user device sends state data to other user devices for synchronization rather than relying on the server system to perform the synchronization.

FIGS. 7-10 are flow diagrams of various implementations of methods related to using an application add-on platform to connect applications to application add-ons and/or other applications. These methods enable flexible extension for applications. The methods also enable resource sharing and multiple-application communication at an application and/or device level. The methods are performed by processing logic that may include hardware (circuitry, dedicated logic, etc.), software (such as is run on a general purpose computer system or a dedicated machine), or a combination of both. In one implementation, the methods may be performed by applications, by an application add-on platform, or by a combination of the two running on a user device.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 7:
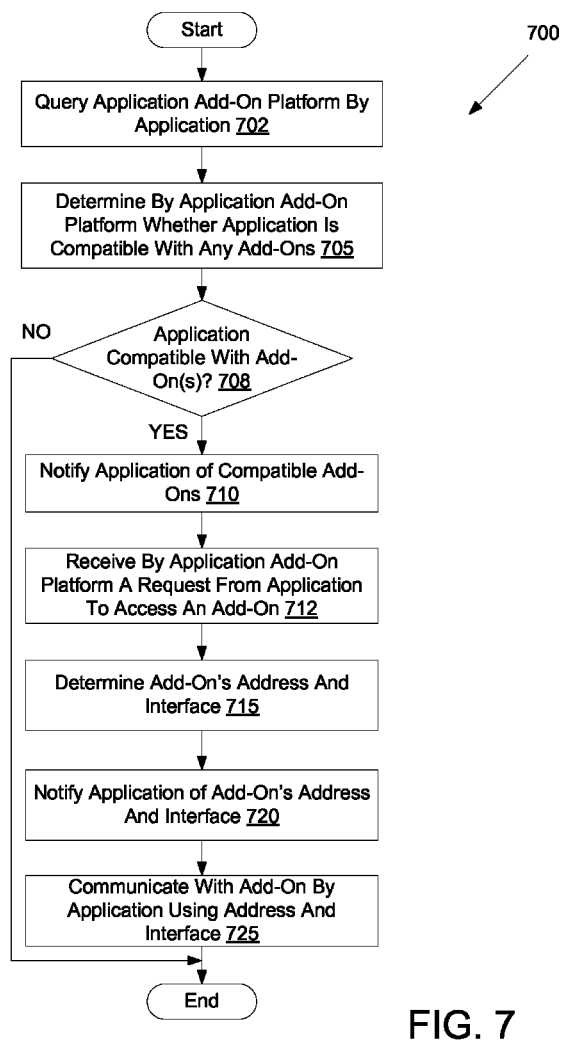

FIG. 7 is a flow diagram illustrating one embodiment for a method 700 of enabling an application to use an application add-on. At block 702 of method 700, an application running on a user device queries an application add-on platform for available add-ons. At block 705, the application add-on platform determines whether the application is compatible with any registered application add-ons. This determination may be made by checking registered add-on metadata and/or by consulting an add-on compatibility data structure. At block 708, if the application is compatible with any application add-ons, the method continues to block 710. Otherwise, the method ends.

At block 710, the application add-on platform notifies the application of those application add-ons that are compatible with the application. At block 712, the application add-on platform receives a request from the application for access to an add-on that the application is compatible with. At block 715, the application add-on platform determines an address and an interface (e.g., an API) of the application add-on. This determination may be made by examining the registered metadata for the application add-on. At block 720, the application add-on platform notifies the application of the add-on's address and of the application add-on's interface. For example, the application add-on platform may send the application data that identifies commands that can be sent to the add-on, a syntax for those commands, and additional data that can be sent along with those commands. At block 725, the application then communicates with the add-on using the address and the data describing the add-on's interface. The method then ends.

Figure 8:
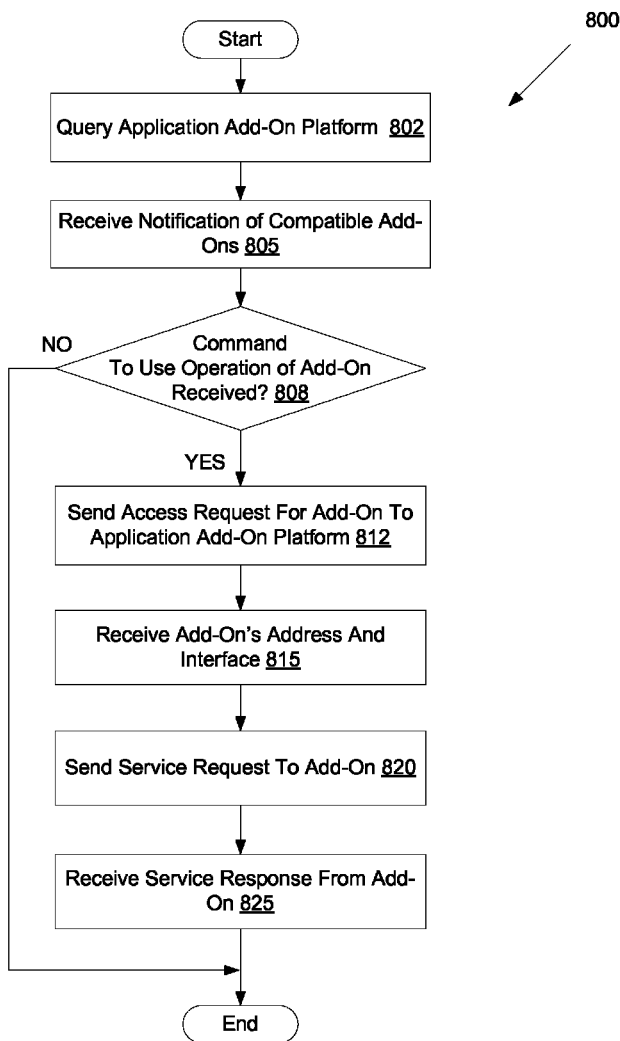
FIG. 8 is a flow diagram of one embodiment for a method of using an application add-on by an application.

FIG. 8 is a flow diagram of one embodiment for a method 800 of using an application add-on by an application. Method 800 may be performed by an application running on a user device. At block 802, processing logic queries an application add-on platform for available add-ons. At block 805, the processing logic receives a notification of compatible add-ons. At block 808, processing logic determines whether a command to use any of the compatible add-ons has been received. The command may be a user command or may be an application initiated command that is not based on user input. If no such command is received, the method ends. If such a command is received, the method continues to block 812.

At block 812, processing logic sends an access request for the add-on to the application add-on platform. At block 815, processing logic receives the add-on's address and information on an interface of the add-on. At block 820, the processing logic sends a service request to the add-on using the received address and information on the add-on's interface. The service request may be directed to the add-on's address and may be formatted such that that the add-on will be able to interpret the request and perform one or more operations based on the service request. In other words, the composition of the message may be structured to comply with requirements of the application add-on's interface. For example, the service request may be a message having a specific header, body, payload, and so forth. At block 825, processing logic receives a service response from the add-on. The service response may include an output of the requested operation.

Figure 9:
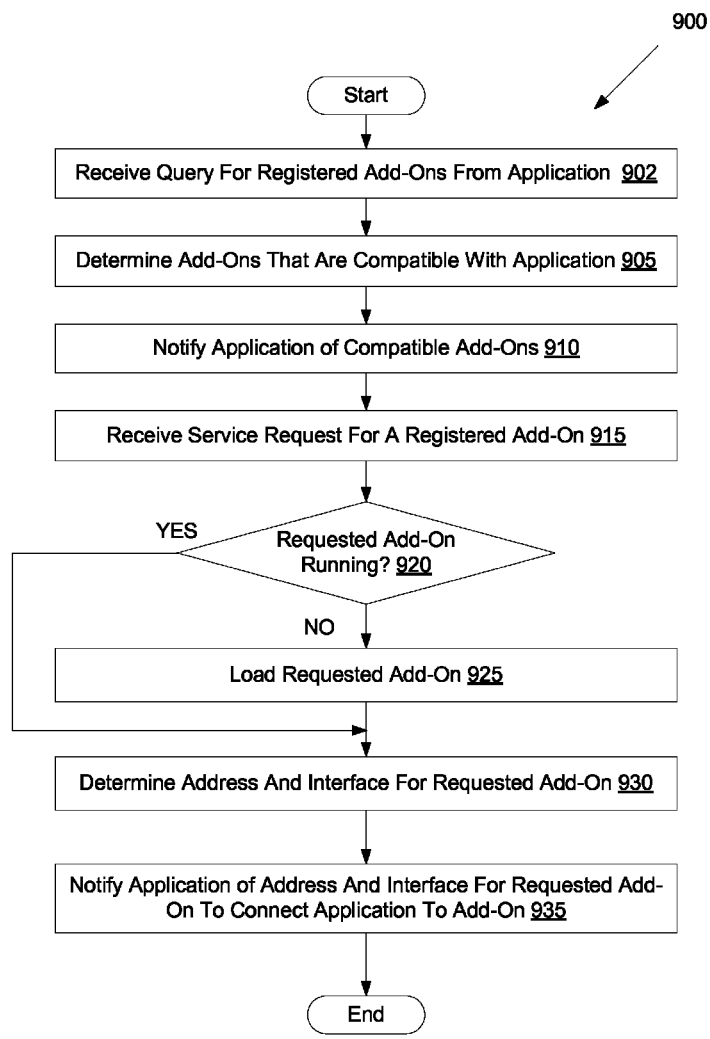

FIG. 9 is a flow diagram of one embodiment for a method 900 of enabling an application to use an application add-on. Method 900 may be performed by an application add-on platform running on a user device. At block 902, processing logic receives a query for registered add-ons from an application. At block 905, processing logic determines add-ons that are compatible with the application. At block 910, processing logic notifies the application of the compatible add-ons.

At block 915, processing logic receives a service request for a registered add-on that the application is compatible with. At block 920, processing logic determines whether the requested add-on is running. If the application add-on is running, the method proceeds to block 930. Otherwise, the method continues to block 925, and processing logic loads the requested add-on.

At block 930, processing logic determines an address and an interface for the requested add-on. At block 935, processing logic notifies the application of the address and the interface for the requested add-on. The application may then use this information to connect to the add-on.

Figure 10:
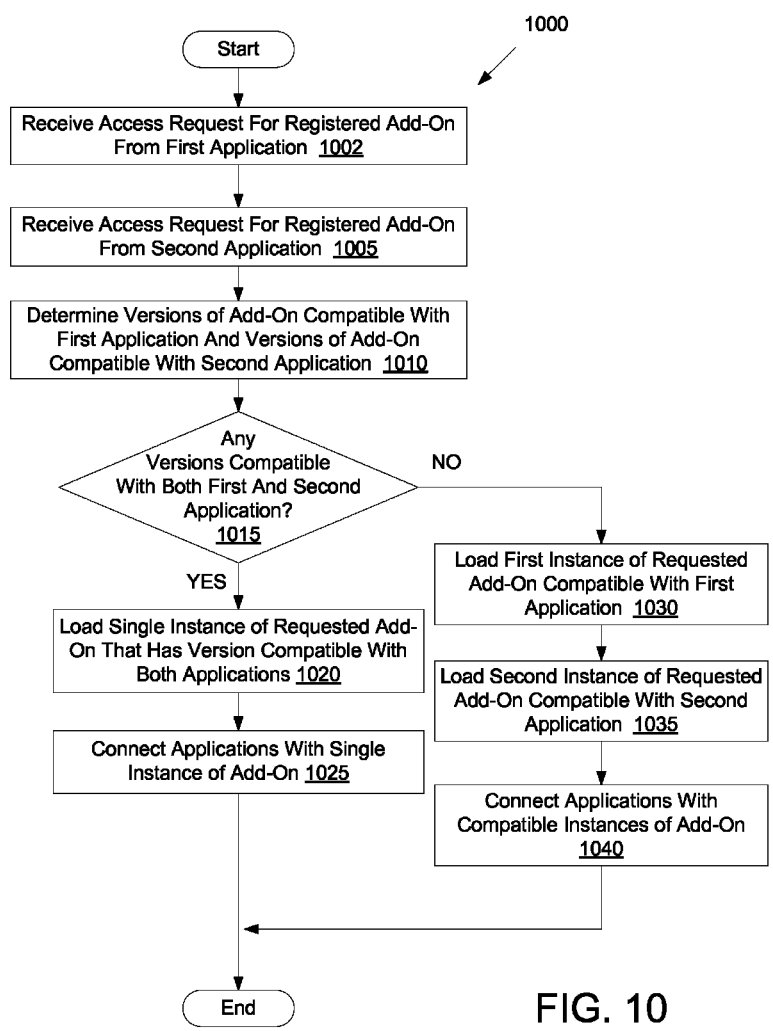

FIG. 10 is a flow diagram of one embodiment for a method 1000 of enabling multiple applications to use an application add-on. Method 1000 may be performed by an application add-on platform running on a user device. At block 1002, processing logic receives an access request for a registered add-on from a first application. At block 1005, processing logic receives an access request for the registered add-on from a second application.

At block 1010, processing logic determines versions of the add-on that are compatible with the first application and versions of the add-on that are compatible with the second application. This may be performed by checking metadata associated with the add-on and/or metadata associated with the applications. Additionally, or alternatively, this may be performed by consulting a data structure that maps add-ons to compatible or approved applications. At block 1015, processing logic determines whether there are any versions of the add-on that are compatible with both the first application and the second application. If so, the method continues to block 1020. Otherwise, the method proceeds to block 1030.

At block 1020, processing logic loads a single instance of the requested add-on. The single instance of the add-on that is loaded is compatible with both the first application and the second application. At block 1025, processing logic connects the first application and the second application to the single instance of the add-on.

At block 1030, processing logic loads a first instance of the requested add-on that is compatible with the first application. At block 1035, processing logic loads a second instance of the requested add-on that is compatible with the second application. At block 1040, processing logic connects the first application with the first instance of the add-on and connects the second application with the second instance of the add-on. The method then ends.

FIG. 11 is a sequence diagram illustrating one embodiment of an application using an application add-on. An application 1102, an application add-on 1106 and an application add-on platform 1104 may all run on a user device. At block 1110, the application 1102 is loaded on the user device. The application may then query the application add-on platform 1104 for available add-ons 1115.

At block 1120, the application add-on platform 1104 determines available add-ons that are compatible with the application. The application add-on platform 1104 then notifies the application of any compatible add-ons 1125.

At block 1130, the application receives a user request for an operation associated with one of the compatible add-ons. The application 1102 then sends an access request for the add-on 1135 to the application add-on platform 1104.

At block 1140, the application add-on platform determines an address and an interface of the add-on. The application add-on platform then sends information on the address and the add-on's interface to the application 1102. Subsequently, the application 1102 uses the address and interface information to send a service request 1150 to the application add-on 1106.

At block 1155, the application add-on performs the requested operation. The application add-on then sends a service response 1160 to the application 1102. The application may send subsequent service requests to the application add-on 1106 using the address and interface information. Accordingly, the application 1102 may communicate directly with the application add-on 1106 for all subsequent transactions once the application receives the information identifying how to communicate with the application add-on from the application add-on platform.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "querying", "determining", "notifying", "receiving", "communicating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    querying, by an application running on a device, an application add-on platform executed by a processing device of the device for available add-ons;
    determining, by the application add-on platform, one or more add-ons that are compatible with the application;
    notifying, by the application add-on platform, the application of the one or more compatible add-ons;
    receiving, by the application add-on platform, a request from the application to access an add-on of the one or more compatible add-ons;
    determining, by the application add-on platform, an address of the add-on and an application programming interface (API) of the add-on;
    notifying the application of the address and of the API;
    sending a service request to the add-on by the application using the address and the API;
    receiving a request to access the add-on from a second application by the application add-on platform;
    connecting the add-on to the second application; and
    communicating with the add-on by the second application, wherein a single instance of the add-on is used by both the application and the second application.

2. The method of claim 1, wherein determining the one or more add-ons that are compatible with the application comprises:
    identifying a version of the application;
    determining the one or more add-ons that are compatible with the version of the application based on metadata associated with the add-ons; and
    determining versions of the one or more add-ons that are compatible with the version of the application based on the metadata.

3. The method of claim 1, wherein the application add-on platform runs in a first process space on the device, the application runs in a second process space on the device that is isolated from the first process space, and the add-on is a standalone application that runs in a third process space on the device that is isolated from the first process space and the second process space.

4. A method comprising:
    querying, by an application running on a device, an application add-on platform executed by a processing device of the device for available add-ons;
    receiving, by the application, a notification of one or more add-ons that are compatible with the application;
    sending, by the application, an access request for an add-on of the one or more add-ons to the application add-on platform;
    receiving, by the application, an address of the add-on and data for an interface of the add-on; and
    using, by the application, the address and the data for the interface to send a message to the add-on, wherein a single instance of the add-on communicates with a second application.

5. The method of claim 4, further comprising:
querying the application add-on platform by the application upon the application being loaded.

6. The method of claim 4, wherein the access request for the add-on causes the application add-on platform to load the add-on.

7. The method of claim 4, wherein the application add-on platform runs in a first process space on the device, the application runs in a second process space on the device that is isolated from the first process space, and the add-on runs in a third process space on the device that is isolated from the first process space and the second process space.

8. The method of claim 4, wherein the add-on is a standalone application that can run independently of the application.

9. The method of claim 4, wherein the access request for the add-on is sent to the application add-on platform in response to receiving a command from a user to perform an operation that is associated with the add-on.

10. The method of claim 4, wherein the application comprises an application add-on service development kit (SDK) that performs the querying of the application add-on platform, the receiving of the notification, the sending of the access request, and the receiving of the address and of the data for the interface of the add-on.

11. A computer readable storage medium having instructions that, when executed by a processing device of a user device, cause the processing device to perform a method comprising:
receiving, by an application add-on platform of the user device from an application running on the user device, a query for add-ons;
notifying, by the application add-on platform, the application of one or more add-ons that are compatible with the application;
receiving, by the application add-on platform, an access request from the application for an add-on of the one or more add-ons;
receiving, by the application add-on platform, a second access request from a second application for the add-on of the one or more add-ons; and
connecting, by the application add-on platform, the application and the second application to a single instance of the add-on.

12. The computer readable storage medium of claim 11, wherein connecting the application to the add-on comprises:
determining an address of the add-on and data identifying an interface of the add-on by the application add-on platform; and
notifying the application of the address and of the data identifying the interface of the add-on.

13. The computer readable storage medium of claim 11, wherein determining the one or more add-ons that are compatible with the application comprises:
identifying a version of the application;
determining registered add-ons that are compatible with the version of the application based on metadata associated with the registered add-ons; and
determining versions of the registered add-ons that are compatible with the version of the application.

14. The computer readable storage medium of claim 11, the method further comprising:
selecting a version of the add-on that is compatible with both the application and the second application.

15. The computer readable storage medium of claim 11, the method further comprising:
determining whether the add-on is running on the user device; and
loading the add-on if the add-on is not running.

16. The computer readable storage medium of claim 11, wherein the application add-on platform runs in a first process space on the user device, the application runs in a second process space on the user device that is isolated from the first process space, and the add-on is a standalone application that runs in a third process space on the user device that is isolated from the first process space and the second process space.

17. The computer readable storage medium of claim 11, the method further comprising:
incrementally upgrading the add-on without updating the application, wherein incrementally upgrading the add-on adds additional features that are available for use by the application.

18. The computer readable storage medium of claim 11, the method further comprising:
receiving the add-on from a remote device; and
registering the add-on with the application add-on platform, the registering comprising recording metadata of the add-on to a data store, the metadata including data identifying an interface of the add-on and application compatibility of the add-on.

19. A user device comprising:
a memory to store instructions for an application add-on platform; and
a processing device connected with the memory, wherein the processing device is configured to:
execute an application in a first process space; and
execute the application add-on platform in a second process space, the application add-on platform to:
receive, from the application, a query for add-ons that have been registered with the application add-on platform;
notify the application of one or more registered add-ons that are compatible with the application;
receive an access request from the application for an add-on of the one or more registered add-ons;
receive a second access request from a second application for the add-on of the one or more registered add-ons; and
connect a single instance of the add-on to the application and the second application.

20. The user device of claim 19, wherein connecting the application to the add-on comprises:
determining an address of the add-on and an application programming interface (API) of the add-on; and
notifying the application of the address and of the API.

21. The user device of claim 19, wherein the application add-on platform is further to determine the one or more add-ons that are compatible with the application by identifying a version of the application, determining registered add-ons that are compatible with the version of the application based on metadata associated with the registered add-ons, and determining versions of the registered add-ons that are compatible with the version of the application.

22. The user device of claim 19, wherein the processing device is further configured to execute the second application in a third process space.

23. The user device of claim 19, wherein the processing device is further configured to:
receive the add-on from a remote device; and
register the add-on with the application add-on platform, the registering comprising recording metadata of the add-on to a data store, the metadata identifying an application programming interface (API) of the add-on and application compatibility of the add-on.

* * * * *